(12) United States Patent
Aoyagi et al.

(10) Patent No.: US 8,824,399 B2
(45) Date of Patent: Sep. 2, 2014

(54) MOBILE COMMUNICATION METHOD AND RADIO ACCESS NETWORK APPARATUS

(75) Inventors: Kenichiro Aoyagi, Yokosuka (JP); Yasuhiro Kawabe, Yokosuka (JP); Yuichiro Nakamura, Yokosuka (JP); Hideyuki Matsutani, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 79 days.

(21) Appl. No.: 13/391,493

(22) PCT Filed: Aug. 20, 2010

(86) PCT No.: PCT/JP2010/064113
§ 371 (c)(1), (2), (4) Date: Apr. 30, 2012

(87) PCT Pub. No.: WO2011/021700
PCT Pub. Date: Feb. 24, 2011

(65) Prior Publication Data
US 2012/0207091 A1  Aug. 16, 2012

(30) Foreign Application Priority Data
Aug. 21, 2009  (JP) .................................. 2009-191946

(51) Int. Cl.
| | |
|---|---|
| *H04W 4/00* | (2009.01) |
| *H04W 36/14* | (2009.01) |
| *H04W 60/04* | (2009.01) |
| *H04W 76/06* | (2009.01) |
| *H04B 1/707* | (2011.01) |
| *H04W 76/02* | (2009.01) |
| *H04W 36/18* | (2009.01) |

(52) U.S. Cl.
CPC ............ *H04W 60/04* (2013.01); *H04W 76/064* (2013.01); *H04W 36/14* (2013.01); *H04B 1/707* (2013.01); *H04W 76/025* (2013.01); *H04W 36/18* (2013.01)

USPC ........................................................ 370/329

(58) Field of Classification Search
None
See application file for complete search history.

(56) References Cited

U.S. PATENT DOCUMENTS

2007/0213059 A1   9/2007 Shaheen
(Continued)

FOREIGN PATENT DOCUMENTS

| | | |
|---|---|---|
| CN | 101401470 A | 4/2009 |
| JP | 2009 17342 | 1/2009 |

(Continued)

OTHER PUBLICATIONS

International Search Report Issued Nov. 16, 2010 in PCT/JP10/64113 Filed Aug. 20, 2010.
Office Action issued Mar. 6, 2012 in Japanese Application No. 2009-191946 (With English Translation).
Office Action issued Dec. 26, 2013 in Chinese Patent Application No. 201080037214.6 (with English translation).

*Primary Examiner* — Minh-Trang Nguyen
(74) *Attorney, Agent, or Firm* — Oblon, Spivak, McClelland, Maier & Neustadt, L.L.P.

(57) ABSTRACT

A mobile communication method according to the present invention includes the steps of: after a mobile station UE having RRC connection with the radio network controller RNC gets out of the coverage of the mobile communication system of WCDMA scheme, performing location registration to the mobile communication system of LTE scheme, issuing a notification to the radio network controller RNC by the exchange apparatus SGSN upon reception of predetermined signal, the notification implying that the mobile station UE performs the location registration to the mobile communication system of LTE scheme; and the radio network controller RNC releasing the resources for RRC connection without transmitting a signal to release the resources to the mobile station UE in response to the notification from the exchange apparatus SGSN.

2 Claims, 3 Drawing Sheets

(56) References Cited

U.S. PATENT DOCUMENTS

2008/0025263 A1 1/2008 Pelkonen
2008/0192697 A1* 8/2008 Shaheen ................. 370/331
2008/0311909 A1 12/2008 Taaghol et al.
2009/0239570 A1* 9/2009 Koyanagi et al. ............ 455/525

FOREIGN PATENT DOCUMENTS

| JP | 2009-529830 | 8/2009 |
| WO | 2007 103496 | 9/2007 |
| WO | 2007 144757 | 12/2007 |
| WO | 2008 157123 | 12/2008 |

* cited by examiner

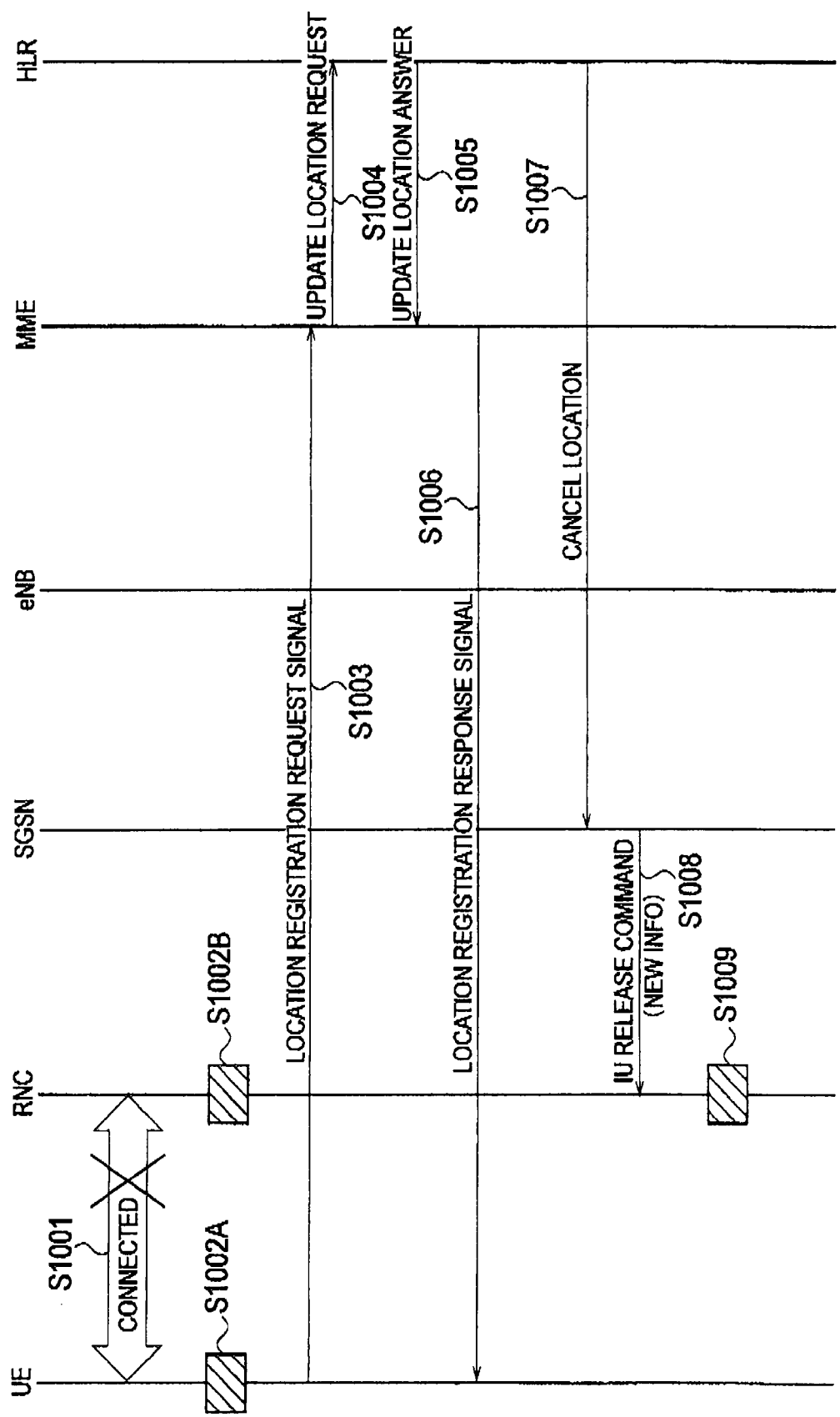

MOBILE COMMUNICATION METHOD AND RADIO ACCESS NETWORK APPARATUS

TECHNICAL FIELD

The present invention relates to a mobile communication method and a radio access network apparatus.

BACKGROUND ART

A mobile communication system including both a WCDMA (Wideband-CDMA) mobile communication system and an LTE (Long Term Evolution) mobile communication system is configured to perform Inter-RAT (Radio Access Technology) mobility control on the WCDMA mobile communication system and the LTE mobile communication system for each mobile station UE.

PRIOR ART DOCUMENT

Patent Document

Patent Document 1: Japanese Patent Application Publication No. 2009-17342

SUMMARY OF THE INVENTION

However, there is a problem that when the mobile station UE transits from a state of having RRC connection with the WCDMA mobile communication system (e.g., Cell PCH state) to a state of having RRC connection with the LTE mobile communication system (e.g., Connected state) without the WCDMA mobile communication system being aware of the transition, the WCDMA mobile communication system cannot release the resources for the RRC connection immediately.

Moreover, there is another problem that, in Inter-RAT mobility control such as NAS (Non Access Stratum) recovery, when the mobile station UE does not issue release notification to the WCDMA mobile communication system, the WCDMA mobile communication system cannot determine whether or not the mobile station UE is returning to communication in the WCDMA mobile communication system by reconnection or the like, and therefore cannot release the resources for the RRC connection immediately.

The present invention was made in consideration of the foregoing problems. It is an objective of the present invention to provide a mobile communication method and a radio access network apparatus, which enable a source mobile communication system to efficiently release resources for RRC connection established with a mobile station during Inter-RAT mobility control to a target mobile communication system for the mobile station.

The first aspect of the present invention is summarized in that a mobile communication method including the steps of: after a mobile station having radio connection with a radio access network apparatus of a first communication scheme gets out of the coverage of a mobile communication system of the first communication scheme, performing, by the mobile station, location registration to a mobile communication system of a second communication scheme, or establishing, by the mobile station, radio connection with a radio access network apparatus of the second communication scheme without performing the location registration; issuing a notification to the radio access network apparatus of the first communication scheme by an exchange apparatus of the first communication scheme upon reception of a predetermined signal, the notification implying that the mobile station performs the location registration to the mobile communication system of the second communication scheme or establishes radio connection with the radio access network apparatus of the second communication scheme; and releasing the resources for radio connection by the radio access network apparatus of the first communication scheme without transmitting a signal to release the resources to the mobile station in response to the notification from the exchange apparatus of the first communication scheme.

The second aspect of the present invention is summarized in that a radio access network apparatus of a first communication scheme, including: a resource management unit configured to release resources for radio connection without transmitting a signal to release the resources to a mobile station upon reception of a notification from an exchange apparatus of the first communication scheme, the notification implying that the mobile station performs location registration to a mobile communication system of a second communication scheme or establishes radio connection with a radio access network apparatus of the second communication scheme without performing the location registration, when the resource management unit recognizes that the mobile station has radio connection with the radio access network apparatus of the first communication scheme.

BRIEF DESCRIPTION OF THE DRAWINGS

FIG. 5 is a sequence diagram showing operations of the mobile communication system according to the first embodiment of the present invention.

MODES FOR CARRYING OUT THE INVENTION (Configuration of Mobile Communication System According to First Embodiment of the Present Invention)

With reference to FIGS. 1 to 4, a mobile communication system according to a first embodiment of the present invention is described.

The mobile communication system according to this embodiment includes a WCDMA mobile communication system (radio access network) as a mobile communication system (radio access network) of a first communication scheme, and also includes an LTE mobile communication system (radio access network) as a mobile communication system (radio access network) of a second communication scheme.

Figure 1:
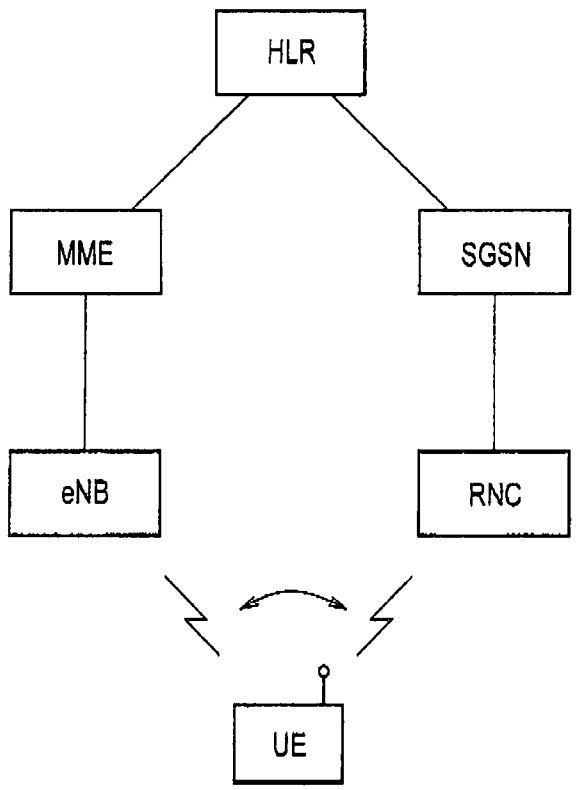
FIG. 1 is an overall configuration diagram of a mobile communication system according to a first embodiment of the present invention.

Specifically, as shown in FIG. 1, the mobile communication system according to this embodiment includes a WCDMA exchange apparatus SGSN, a radio network controller RNC that is a WCDMA radio access network apparatus, an LTE exchange apparatus MME, a radio base station eNB that is an LTE radio access network apparatus, a mobility management server HLR (Home Location Register) connected to the WCDMA exchange apparatus SGSN and the LTE exchange apparatus MME.

The mobile communication system according to this embodiment is configured to perform Inter-RAT control for a mobile station UE.

Specifically, in the mobile communication system according to this embodiment, the mobile station UE is configured to transition from a state of having RRC connection with the WCDMA mobile communication system (e.g., Cell PCH state) to a state of having RRC connection with the LTE mobile communication system (e.g., Connected state).

Figure 2:
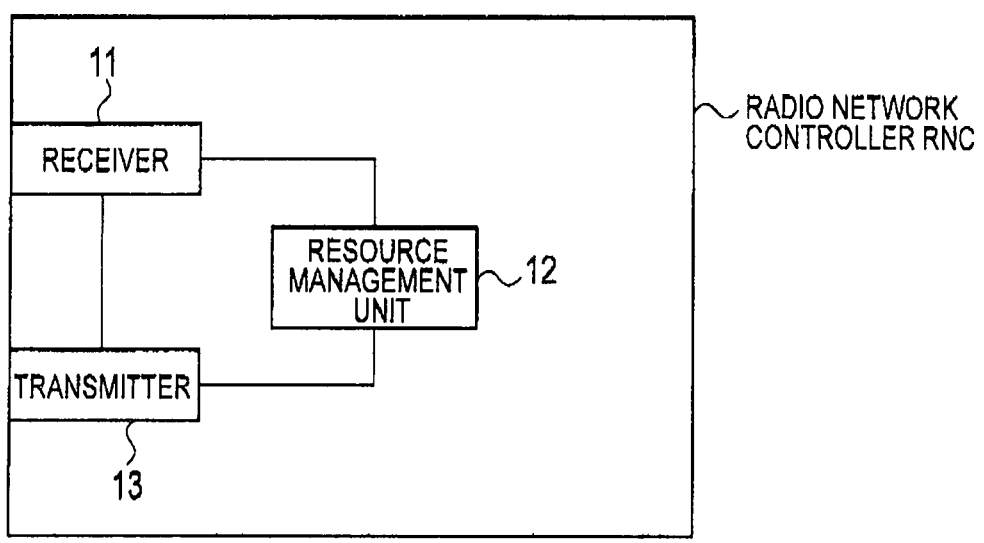
FIG. 2 is a functional block diagram of a radio network controller according to the first embodiment of the present invention.

As shown in FIG. 2, the radio network controller RNC includes a receiver 11, a resource management unit 12 and a transmitter 13.

The receiver 11 is configured to receive various signals transmitted by the mobile station UE, the exchange apparatus SGSN, and the like.

The resource management unit 12 is configured to manage resources for RRC connection established between the radio network controller RNC and the mobile station UE.

Specifically, the resource management unit 12 is configured to assign the resources for RRC connection when the RRC connection is established between the radio network controller RNC and the mobile station UE, and to release the resources for RRC connection when the RRC connection is released.

Here, the resource management unit 12 is configured to, when recognizing that the mobile station UE has RRC connection with the radio network controller RNC, release resources for RRC connection without transmitting a signal to release the resources to the mobile station UE upon receiving from the exchange apparatus SGSN a notification that the mobile station UE performs location registration to the LTE mobile communication system.

Note that, in the mobile communication system according to this embodiment, the location registration by the mobile station UE can be omitted when ISR (Idle Mode Signaling Reduction) is applied to Inter-RAT mobility control.

Therefore, the resource management unit 12 is configured to, when recognizing that the mobile station UE has RRC connection with the radio network controller RNC, release the resources for RRC connection without transmitting a signal to release the resources to the mobile station UE upon reception of a notification of presence in the LTE mobile communication system from the exchange apparatus SGSN, the notification implying that the mobile station UE has RRC connection with the radio base station eNB without performing location registration to the LTE mobile communication system.

The transmitter 13 is configured to transmit various signals to the mobile station UE, the exchange apparatus SGSN, and the like.

Figure 3:
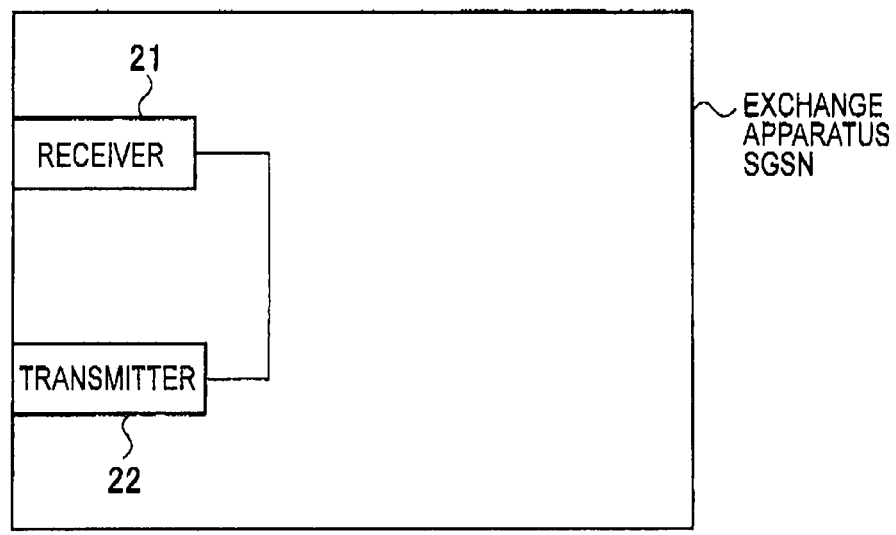
FIG. 3 is a functional block diagram of an exchange apparatus according to the first embodiment of the present invention.

As shown in FIG. 3, the exchange apparatus SGSN includes a receiver 21 and a transmitter 22.

The receiver 21 is configured to receive various signals transmitted by the mobile station UE, the radio network controller RNC, the mobility management server HLR, and the like.

The transmitter 22 is configured to transmit various signals to the mobile station UE, the radio network controller RNC, the mobility management server HLR, and the like.

Figure 4:
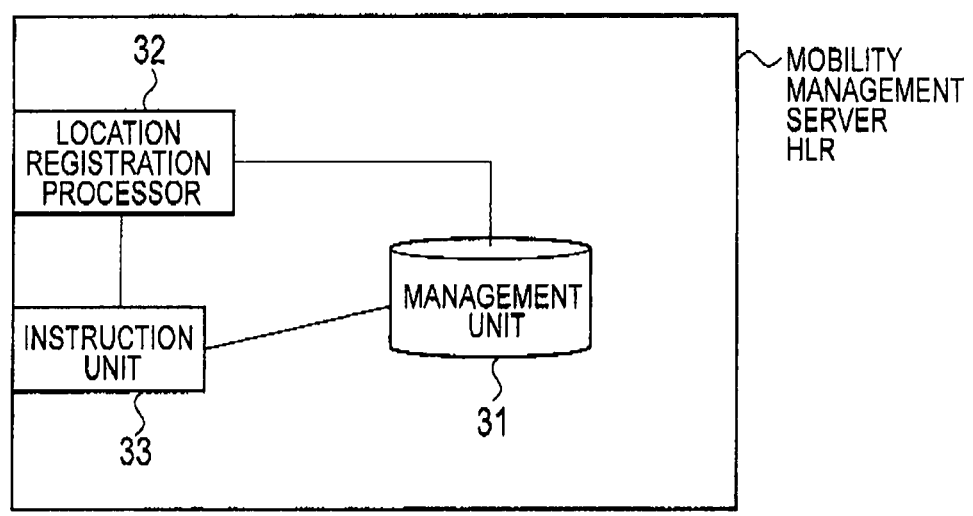
FIG. 4 is a functional block diagram of a mobility management server according to the first embodiment of the present invention.

As shown in FIG. 4, the mobility management server HLR includes a management unit 31, a location registration processor 32 and an instruction unit 33.

The management unit 31 is configured to manage information on the mobile station UE whose location is registered with a cell under the control of the WCDMA mobile communication system or a cell under the control of the LTE mobile communication system.

The location registration processor 32 is configured to transmit and receive signals related to the location registration of the mobile station UE to and from the mobile station UE.

In a case of detecting that the mobile station UE having RRC connection with the radio network controller RNC gets out of the coverage of the WCDMA mobile communication system and performs the location registration to the LTE mobile communication system, the instruction unit 33 is configured to instruct the exchange apparatus SGSN to release the resources for the above RRC connection by transmitting "Cancel Location" to the exchange apparatus SGSN.

(Operations of Mobile Communication System According to First Embodiment of the Present Invention)

With reference to FIG. 5, description is given of operations of the mobile communication system according to the first embodiment of the present invention.

As shown in FIG. 5, in Step S1001, it is detected that the mobile station UE having RRC connection with the radio network controller RNC gets out of the coverage of the WCDMA mobile communication system. In Step S1002A, the mobile station UE determines to handover to the LTE mobile communication system. Here, the mobile station UE does not transmit a signal to request to release the resources for the above RRC connection to the radio network controller RNC.

On the other hand, in Step S1002B, the radio network controller RNC waits for a reconnection request signal from the mobile station UE without releasing the resources for RRC connection.

In Step S1003, the mobile station UE transmits a location registration request signal, such as "Attach Request" or "Tracking Area Update," to the exchange apparatus MME.

In step S1004, the exchange apparatus MME transmits "Update Location Request", to the mobility management server HLR in response to the location registration request signal received from the mobile station UE.

In Step S1005, the mobility management server HLR transmits "Update location Answer" to the exchange apparatus MME.

In Step S1006, the exchange apparatus MME transmits the mobile station UE a location registration response signal to the location registration request signal.

In Step S1007, the mobility management server HLR transmits "Cancel Location" to the exchange apparatus SGSN.

In Step S1008, the exchange apparatus SGSN transmits "Iu Release Command" including "New Info" to the radio network controller RNC in response to "Cancel Location."

Here, "Iu Release Command" is an RANAP signal to instruct to release the RRC connection established between the mobile station UE and the radio network controller RNC. "New Info" is information (e.g., such as predetermined information or a predetermined flag) for notifying that the mobile station UE performs the location registration to the LTE mobile communication system.

In Step S1009, the radio network controller RNC releases the resources without transmitting "RRC Connection Release" that is a signal to release the resources for RRC connection to the mobile station UE in response to "Iu Release Command" including "New Info,"

Here, upon reception of "Iu Release Command" including "New Info," the radio network controller RNC releases the resources for RRC resource without transmitting "RRC Connection Release" to the mobile station UE since "RRC Connection Release" is not received by the mobile station UE even though "RRC Connection Release" is transmitted to the mobile station UE because the mobile station UE has transited from the WCDMA mobile communication system to the LTE mobile communication system.

(Advantageous Effects of Mobile Communication System According to First Embodiment of the Present Invention)

In the mobile communication system according to this embodiment, the radio network controller RNC can efficiently release the resources for RRC connection in response to "Iu Release Command" including "New Info" received from the exchange apparatus SGSN, even if the mobile station UE having RRC connection with the radio network controller RNC transits to the LTE mobile communication system without transmitting a signal to request to release the resources for RRC connection to the radio network controller RNC when detecting that the mobile station UE gets out of the coverage of the WCDMA mobile communication system.

The above aspects of this embodiment may be expressed as follows.

A first aspect of this embodiment is a mobile communication method including the steps of: after a mobile station UE having RRC connection (radio connection) with the radio network controller RNC (radio access network apparatus of a first communication scheme) gets out of the coverage of the mobile communication system of WCDMA scheme (first communication scheme), performing, by the mobile station UE, location registration to the mobile communication system of LTE scheme (second communication scheme), or establishing, by the mobile station, RRC connection with the radio base station eNB without performing the location registration when ISR is applied to Inter-RAT mobility control; issuing a notification to the radio network controller RNC by the exchange apparatus SGSN (exchange apparatus of the first communication scheme) upon reception of "Cancel Location (predetermined signal)," the notification implying that the mobile station UE performs the location registration to the mobile communication system of LTE scheme or establishes the RRC connection with the radio base station eNB; and the radio network controller RNC releasing the resources for RRC connection without transmitting a signal to release the resources to the mobile station UE in response to the notification from the exchange apparatus SGSN.

A second aspect of this embodiment is the radio network controller RNC including the resource management unit 12 configured to release resources for RRC connection without transmitting a signal to release the resources to the mobile station UE upon receiving from the exchange apparatus SGSN a notification implying that the mobile station UE performs the location registration to the mobile communication system of LTE scheme or establishes the RRC connection with the radio base station eNB without performing the location registration, when the resource management unit 12 recognizes that the mobile station UE has RRC connection with the radio network controller RNC, Note that operations of the above-described the mobility management server HLR, the exchange apparatus SGSN, the radio network controller RNC, the exchange apparatus MME, radio base station eNB, or the mobile station UE may be implemented by hardware or may be implemented by a software module to be executed by a processor, or may be implemented in combination of the both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk drive, or a CD-ROM.

The storage medium is connected to the processor so that the processor can read and write information from and to the storage medium. Also, the storage medium may be integrated into the processor. Also, the storage medium and the processor may be provided in an ASIC The ASIC may be provided in the mobility management server HLR, the exchange apparatus SGSN, the radio network controller RNC, the exchange apparatus MME, the radio base station eNB, or the mobile station UE. Also, the storage medium and the processor may be provided in the mobility management server HLR, the exchange apparatus SGSN, the radio network controller RNC, the exchange apparatus MME, radio base station eNB, or the mobile station UE as a discrete component.

Hereinabove, the present invention has been described in detail using the above embodiment; however, it is apparent for those skilled in the art that the present invention is not limited to the embodiment described herein. Modifications and variations of the present invention can be made without departing from the scope of the present invention defined by the description of the scope of claims. Thus, what is described herein is for illustrative purpose, and has no intention whatsoever to limit the present invention.

Note that the contents of Japanese Patent Application No. 2009-191946 (filed on Aug. 21, 2009) are incorporated herein by reference in their entirety.

INDUSTRIAL APPLICABILITY

The present invention is useful for radio communication and the like since the invention enables a source mobile communication system to efficiently release resources for RRC connection established with a mobile station during Inter-RAT mobility control to a target mobile communication system for the mobile station.

EXPLANATION OF REFERENCE NUMERALS

RNC . . . radio network controller
11, 21 . . . receiver
12 . . . resource management unit
13, 22 . . . transmitter
SGSN, MME . . . exchange apparatus
HLR . . . mobility management server
31 . . . management unit
32 . . . location registration processor
33 . . . instruction unit
UE . . . mobile station

The invention claimed is:

1. A mobile communication method comprising the steps of:
after a mobile station having radio connection with a radio access network apparatus leaves a mobile coverage area of a Wideband Code Division Multiple Access (WCDMA) mobile communication system, performing, by the mobile station, location registration to a mobile communication system of a Long Term Evolution (LTE) mobile communication system, or establishing, by the mobile station, radio connection with a radio access network apparatus of the LTE mobile communication system without performing the location registration;
issuing a notification to the radio access network apparatus of the WCDMA mobile communication system by an exchange apparatus of the WCDMA mobile communication system upon reception of a predetermined signal, the notification implying that the mobile station performs the location registration to the LTE mobile communication system or establishes radio connection with the radio access network apparatus of the LTE mobile communication system; and releasing the resources for radio connection by the radio access network apparatus of the WCDMA mobile communication system without transmitting a signal to release the resources to the mobile station in response to the notification from the exchange apparatus of the WCDMA mobile communication system.

2. A radio access network apparatus of a Wideband Code Division Multiple Access (WCDMA) mobile communication system, comprising:

resource management circuitry configured to release resources for radio connection without transmitting a signal to release the resources to a mobile station upon reception of a notification from an exchange apparatus of the WCDMA mobile communication system, the notification implying that the mobile station performs location registration to a Long Term Evolution (LTE) mobile communication system or establishes radio connection with a radio access network apparatus of the LTE mobile communication system without performing the location registration, when the resource management circuitry recognizes that the mobile station has a radio-connection with the radio access network apparatus of the WCDMA mobile communication system.

* * * * *